(12) United States Patent
Karpman et al.

(10) Patent No.: US 6,487,491 B1
(45) Date of Patent: Nov. 26, 2002

(54) SYSTEM AND METHOD OF CONTROLLING CLEARANCE BETWEEN TURBINE ENGINE BLADES AND CASE BASED ON ENGINE COMPONENTS THERMAL GROWTH MODEL

(75) Inventors: Boris Karpman, Marlborough, CT (US); John L. Shade, Portland, CT (US); Daniel E. Kane, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/990,661

(22) Filed: Nov. 21, 2001

(51) Int. Cl.⁷ .................................................. F02K 3/04
(52) U.S. Cl. ........................ 701/100; 415/115; 415/116; 415/117; 60/782
(58) Field of Search ................................ 701/100, 101, 701/102, 103; 415/126, 97 R, 115, 116, 117, 119, 145, 173.1, 173.2, 173.3, 174.5, 175, 176, 178; 60/782

(56) References Cited

U.S. PATENT DOCUMENTS

| | | | |
|---|---|---|---|
| 4,329,114 A | * 5/1982 | Johnston et al. | 415/116 |
| 5,012,420 A | 4/1991 | Walker et al. | 701/100 |
| 5,545,007 A | * 8/1996 | Maetin et al. | 415/173.2 |
| 6,272,422 B2 | * 8/2001 | Khalid et al. | 701/100 |

* cited by examiner

Primary Examiner—William A. Cuchlinski, Jr.
Assistant Examiner—Marthe Y. Marc-Coleman

(57) ABSTRACT

A system and method of controlling clearance in a turbomachine includes adjusting the machine case cooling air in response to the difference between the desired clearance and the actual clearance. An accurate estimate of the actual clearance is made with a real time mathematical model on-board engine controller. The model computes thermal growth of the turbomachine components each with a difference equation derived from a closed form solution to the $1^{st}$ order differential equation obtained through the application of $1^{st}$ law of thermodynamics. The resulting equation is conveniently formulated in terms of equivalent time constant and steady state growth both correlated with thermophysical characteristics of multiple fluid streams exchanging heat with the component. The solution is applied over a time step of the control software. Approximating coefficients are strategically placed in the model to allow calibration of the model to a particular version of the engine hardware.

19 Claims, 2 Drawing Sheets

SYSTEM AND METHOD OF CONTROLLING CLEARANCE BETWEEN TURBINE ENGINE BLADES AND CASE BASED ON ENGINE COMPONENTS THERMAL GROWTH MODEL

FIELD OF THE INVENTION

The present invention generally relates to a system and method of clearance control of motor or engine fan blades, and more particularly relates to a system and method of determining thermal growth of motor or engine parts to thereupon control the clearance of motor or engine fan blades.

BACKGROUND OF THE INVENTION

The knowledge and control of radial growth of turbo-machinery components has long been a stumbling block on the way to achieving higher efficiency and stability levels demanded by the designers of gas turbine engines, pumps and compressors. This undesirable situation is driven in part by lack of reliable, accurate and affordable sensors for measuring radial growth. Alternatively, the radial growth can be computed using a mathematical model that relates growth to various turbo-machine measured and otherwise obtained parameters. Numerous attempts were made in the past to devise such an algorithm. However, none of the known algorithms delivered required steady state and transient accuracy, ability to calibrate the equations to high fidelity data and formulation suitable for implementation in a digital computer.

Imperfect control of the clearance between a turbine engine fan blade and case results in either the clearance being too loose or the clearance being too tight resulting in excessive rubs. In either instance, imperfect clearance results in loss of performance (e.g. engine efficiency, thrust) and/or violation of the engine operating limits (e.g. exhaust gas temperature overshoot) and/or reduced compressor stability. Standard practice has been to design a clearance control system to prefer loose clearance over fight clearance which may also result in damage to the blades and case. Some engines such as, for example, the PW4000 use an open loop clearance control system that sacrifices significant performance in comparison with a "perfect" clearance control system. Other engines such as, for example, the V2500 use a closed loop system that relies on crudely modeled clearances and therefore sacrifices less performance, but still falls short of ideal clearance control.

Improved accuracy and reliability in estimating tip clearances will also enable the clearance control system to be active during those parts of an airplane mission that are more likely to experience abrupt changes in operating conditions. For example, a typical active clearance control system is traditionally deactivated during airplane takeoff where tip clearances are particularly hard to predict due to rapidly changing engine operating conditions. This approach worked well in the past for the cases where takeoff constituted a relatively small portion of the overall airplane mission and the engine stability margins were conservatively high. In contrast, takeoff fuel economy gains importance for the engines designed for short haul aircraft applications such as, for example, PW6000 designed for A318 application. The ability to deploy active clearance control during takeoff also increases the exhaust gas temperature margin which otherwise diminishes with increased clearance, and helps to avoid clearance induced stability loss. Thus, it is desirable to further improve clearance control accuracy to, in turn, improve engine performance while maintaining all operating limits, compressor stability and ensuring reliable rub-free operation throughout the airplane mission The principal difficulty in modeling clearances for a closed loop system resides in modeling the thermal growths of the engine components, not in modeling the mechanical strains which are relatively easy to calculate. Thermal growths are far more difficult to model because the physical configurations of the engine components and the multiple time varying influences to which those components are subjected (i.e., throttle transients, multiple fluid streams of different and time varying temperatures, flow rates, etc.) complicate the problem of modeling the heat transfer and energy storage phenomenon.

In view of the foregoing, it is a general object of the present invention to provide a system and method of clearance control that overcomes the above-mentioned drawbacks.

SUMMARY OF THE INVENTION

In one aspect of the present invention a method of controlling clearance in a turbomachine between blades and a wall adjacent to and opposing tips of the blades includes adjusting air flow adjacent to the wall in response to the difference between the desired clearance and the actual clearance. Due to lack of suitable sensors, an accurate and reliable estimate of the actual clearance is made with a real time, mathematical model running, on-board engine controller. As part of the clearance calculation the subject model computes thermal growth of the turbomachine components and their subcomponents with a difference equation derived from a closed form solution to the $1^{st}$ order differential equation obtained through the application of the $1^{st}$ law of thermodynamics. The component is treated as being made of uniform material with given average specific heat and mass while at uniform temperature throughout the volume. The heat transfer phenomenon is modeled as a sum of a finite number of heat transfer processes taking place over the entire area of the component interface with the known gas turbine fluid streams. Each heat transfer process is characterized by a local average heat transfer coefficient, contact surface area and fluid temperature. The solution is defined over a time step of the control software assuming either step or ramp input and is expressed in terms of equivalent time constant, steady state growth and a set of approximating coefficients. The steady state growth is calculated as a weighted average of the growths due to thermal exchange with fluid streams of varying temperatures, flow rates and thermo-physical properties. The weighting is accomplished with performance parameters that are first formed as functions of the local fluid stream area of contact, the local heat transfer coefficient, the total component mass and the component average specific heat. Then, recognizing that these characteristics are impractical to define for a specific component or its subcomponents, the performance parameters are correlated with the measured and otherwise synthesized engine characteristics such as shaft speeds, pressures and temperatures. Finally, the inverse of the equivalent time constant is calculated as a sum of the same performance parameters.

In a second aspect of the present invention, a system for controlling clearance in a turbomachine between blades and a wall adjacent to and opposing tips of the blades includes adjusting air flow adjacent to the wall in response to the difference between the desired clearance and the actual clearance. Due to lack of suitable sensors, an accurate and reliable estimate of the actual clearance is made with a real time, mathematical model running, on-board engine controller. As part of the clearance calculation the subject model computes thermal growth of the turbomachine components with a difference equation derived from a closed form solution to the $1^{st}$ order differential equation obtained through the application of the $1^{st}$ law of thermodynamics. The component is treated as being made of uniform material with given average specific heat and mass while at uniform temperature throughout the volume. The heat transfer phenomenon is modeled as a sum of a finite number of heat transfer processes taking place over the entire area of the component interface with the known gas turbine fluid streams. Each heat transfer process is characterized by a local average heat transfer coefficient, contact surface area and fluid temperature. The solution is defined over a time step of the control software assuming either step or ramp input and is expressed in terms of equivalent time constant, steady state growth and a set of approximating coefficients. The steady state growth is calculated as a weighted average of the growths due to thermal exchange with fluid streams of varying temperatures, flow rates and thermo-physical properties. The weighting is accomplished with performance parameters that are first formed as functions of the local fluid stream area of contact, the local heat transfer coefficient, the total component mass and the component average specific heat. Then, recognizing that these characteristics are impractical to define for a specific component, the performance parameters are correlated with the measured and otherwise synthesized engine characteristics such as shaft speeds, pressures and temperatures. Finally, the inverse of the equivalent time constant is calculated as a sum of the same performance parameters.

In a third aspect, a gas turbine engine system comprises an engine including case and disk with blades rotatable within the case. Means are provided for controlling clearance in a turbomachine between blades and a wall adjacent to and opposing tips of the blades to adjust air flow adjacent to the wall in response to the difference between the desired clearance and the actual clearance. Due to lack of suitable sensors, an accurate and reliable estimate of the actual clearance is made with a real time, mathematical model running, on-board engine controller. As part of the clearance calculation the subject model computes thermal growth of the turbomachine components with a difference equation derived from a closed form solution to the $1^{st}$ order differential equation obtained through the application of the $1^{st}$ law of thermodynamics. The component is treated as being made of uniform material with given average specific heat and mass while at uniform temperature throughout the volume. The heat transfer phenomenon is modeled as a sum of finite number of heat transfer processes taking place over the entire area of the component interface with the known gas turbine fluid streams. Each heat transfer process is characterized by a local average heat transfer coefficient, contact surface area and fluid temperature. The solution is defined over a time step of the control software assuming either step or ramp input and is expressed in terms of equivalent time constant, steady state growth and a set of approximating coefficients. The steady state growth is calculated as a weighted average of the growths due to thermal exchange with fluid streams of varying temperatures, flow rates and thermo-physical properties. The weighting is accomplished with performance parameters that are first formed as functions of the local fluid stream area of contact, the local heat transfer coefficient, the total component mass and the component average specific heat. Then, recognizing that these characteristics are impractical to define for a specific component, the performance parameters are correlated with the measured and otherwise synthesized engine characteristics such as shaft speeds, pressures and temperatures. Finally, the inverse of the equivalent time constant is calculated as a sum of the same performance parameters.

An advantage of the present invention is that the thermal growths of turbomachine components and its sub-components may be accurately and reliably determined for subsequent use in the estimation of actual clearance of a turbomachine which is a required element in closed loop active clearance control schemes such as one typically employed in a turbine case cooling.

A second advantage of the present invention is that an accurate numerical technique, namely a closed form solution to the governing differential equation applied over time step of control software is employed to implement $1^{st}$ order dynamics of the thermal growth.

A third advantage is that the effect of multiple fluid streams is accounted for in the calculation of both steady state and transient characteristics of the thermal growth.

A fourth advantage is the allowance of finite order dynamics to be implemented as the sum of $1^{st}$ order dynamic elements. Thus, to model a component of complex geometry and heat transfer phenomenon the component can be sub-divided into a finite number of sub-components each modeled with a $1^{st}$ order dynamic element.

A fifth advantage is the use of approximating coefficients to allow for calibration against high fidelity models and test data, and to facilitate the model traceability to a specific set of turbomachine hardware which may be changing through the operational life of the machine.

A sixth advantage is that the physics-based model increases chances of sensible results outside the machine operating envelope.

These and other advantages of the present invention will become more apparent in the light of the following detailed description and accompanying figures.

DETAILED DESCRIPTION OF THE PREFERRED EMBODIMENT

A system and method of determining and controlling clearance between turbine engine fan blades and the engine case with unique synthesis of thermal growth of the engine components is explained in accordance with the present invention with reference to the following equations and figures.

Figure 1:
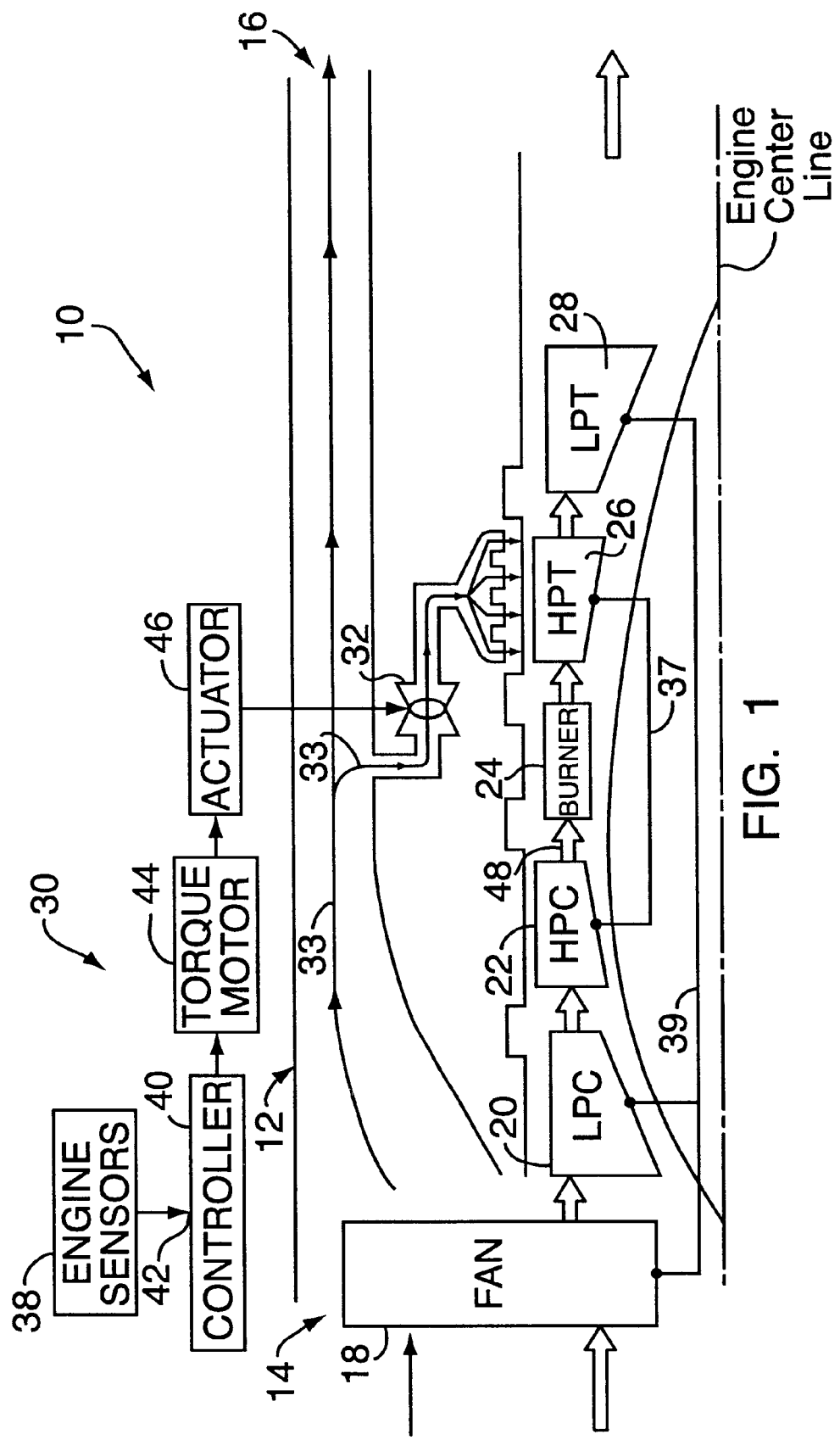
FIG. 1 schematically shows a turbine engine with a clearance control system in accordance with the present invention.
Figure 2:
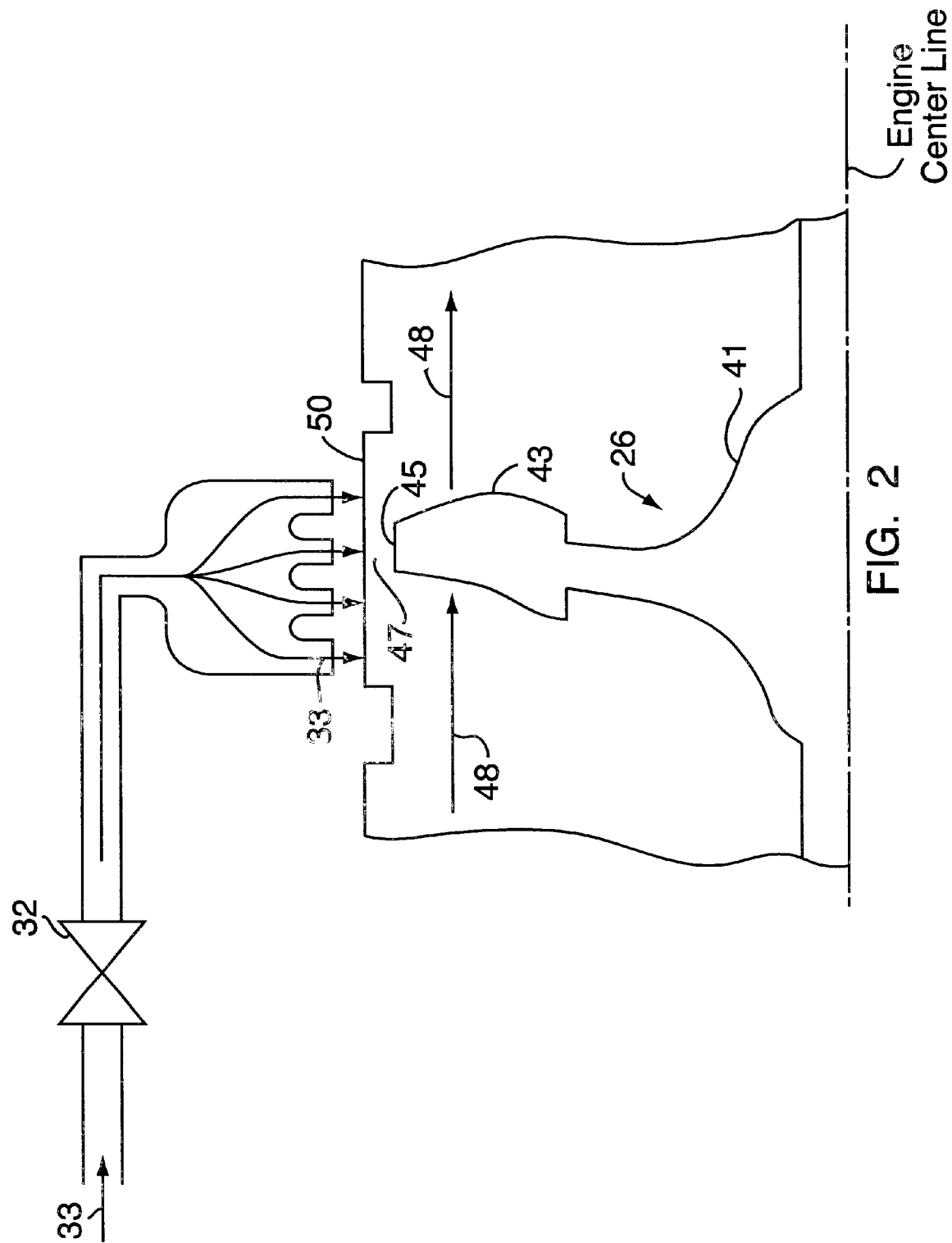
FIG. 2 is an enlarged partial view of the turbine engine with clearance control of FIG. 1.

With reference to FIGS. 1 and 2, a gas turbine engine and system for controlling clearance between blades and the engine case is generally designated by the reference number 10. Although the present invention will be explained primarily with respect to a gas turbine engine, it should be understood that the present invention may be employed with other types of systems employing turbomachinery such as, for example, refrigeration systems without departing from the scope of the present invention.

As seen in FIGS. 1 and 2 in a direction along a gas turbine engine 12 from an inlet end 14 to an outlet end 16, the turbine engine includes a fan 18, a low pressure compressor 20, a high pressure compressor 22, a burner 24 for injecting fuel into an air stream, a high pressure turbine 26 and a low pressure turbine 28. A system 30 for controlling clearance includes a valve 32, such as a butterfly valve, that is continuously adjustable from a fully closed position to a fully open position for diverting an auxiliary or cooling air flow, indicated by the arrows 33, 33, from a fan stream onto an engine case 50 for cooling the engine case in order to provide a desired clearance between the case and the engine blades. The high pressure compressor 22 and the high pressure turbine 26 are on a first spool (high spool) as schematically illustrated by line 37 connecting the high pressure compressor and the high pressure turbine. Similarly, the fan 18, the low pressure compressor 20, and the low pressure turbine 28 are on a second spool (low spool) as schematically illustrated by line 39 connecting the low pressure compressor and the low pressure turbine. As shown in FIG. 2, for example, the high pressure turbine 26 includes a disk 41 and a blade 43. A tip 45 of the blade and the opposing case or wall 50 cooperate to define a clearance distance 47 therebetween to be adjusted by controllably diverting a cooling air flow 33 of desired intensity from the fan stream. Engine sensors 38, include high and low spool speed, and burner pressure. It is known that all required fluid temperatures can be synthesized as a function of the readings of the above sensors, ambient conditions and flight speed. Nevertheless, the fluid temperatures can also be directly measured. A controller 40 has an input 42 coupled to the sensors 38. Residing in the controller 40 is the control software that includes logic that determines desired high pressure turbine clearance, the mathematical model that calculates actual clearance and the control algorithm that determines angle of the valve 32 in response to the difference between the desired and the actual clearance.

A motor 44, preferably a dual-channel torque motor, is controllably coupled to the controller 40. An actuator 46, such as a piston actuator, is drivingly coupled to an output of the motor 44. The valve 32 is controllably coupled to the actuator 46.

As is well known in the pertinent art, a gas turbine engine operates by receiving a primary air flow, indicated by the arrows 48, 48, at its inlet end 14 at a relative velocity equal to the flight speed. In passing through the inlet 14, the velocity of the primary air flow 48 is decreased and its pressure is increased. The air flow pressure is further increased as it moves through the compressors 20 and 22. In the burner 24, a steady fuel stream is injected into the primary air flow 48 and combustion of the fuel occurs continuously. The hot gas under high pressure moves through nozzles of the turbines 26 and 28 which direct it at high velocity against buckets on turbine wheels to cause the wheels to rotate. The turbine wheels drive the compressors to which they are connected through a shaft. After the hot gas leaves the turbines 26 and 28, the gas is at a high temperature and at a pressure significantly above atmospheric pressure. The hot gas is discharged at the outlet end 16 of the engine 12 at a high velocity so as to produce thrust.

The determination of thermal growth for controlling clearance in accordance with the present invention will now be more fully explained. The total radial growth may be understood as a sum of the growths because of thermal and mechanical causes. The main difficulty in creating a radial growth calculation technique lies in formulating and solving a differential equation governing radial growth because of thermal expansion of the turbo-machine component material. The formulation must properly describe a component of complex geometry (e.g., turbine case) exchanging heat with several fluid streams of widely varying temperatures and flow rates.

In what follows the first law of thermodynamics is formulated for a closed system that includes turbomachine component subjected to heat transfer with the surrounding fluid flows. The temperature is assumed to be uniform throughout the turbomachine component. The system is assumed to be interfaced with a finite number of gas flows of specified temperature. This formulation leads to a first order differential equation in terms of the component material temperature. The equation is further simplified by defining an equivalent fluid temperature and time constant. A generalized transfer function is derived and a closed form solution for turbomachine component material average temperature for step and ramp changes in equivalent fluid temperature is then obtained by means of Laplace transform. The solutions for turbomachine component temperature is transformed into the one for thermal growth based on linear dependency between the two. Finally, a difference equation for implementation in the controller is formed.

In the following analysis we assume that a turbomachine component has uniform density and material temperature. The subject turbomachine component (hereafter referred to simply as the component) is exchanging heat with a finite number of fluid flows each interfacing with the portion of the metal surface. Under the stated assumptions the first law of thermodynamics takes the following form:

$$dE_{sys}/dt = Q = c_{pm}M(dT_m/dt) = A_1 h_1(T_1 - T_m) + A_2 h_2(T_2 - T_m) + \ldots + A_N h_N(T_N - T_m), \quad (1)$$

Where
 $E_{sys}$—total energy of the component, Btu
 Q—rate of heat transfer, Btu/sec
 $h_i$—heat transfer coefficient of indexed fluid flow, Btu/sec ft² °F.
 $A_i$—area of contact of indexed fluid flow and the component, ft²
 $c_{pm}$—average specific heat of the component material, Btu/lb °F.
 M—mass of the component, lb
 $T_i$—temperature of indexed fluid flow, °F.
 $T_m$—temperature of the component, °F.

Equation (1) can be further simplified by collecting terms and defining a heat transfer performance parameter, an equivalent fluid temperature, and an equivalent time constant as follows:

$$\Pi_i = \frac{A_i h_i}{c_{pm,i} M} \quad (2a)$$

$$T_{eq} = \frac{\sum_{i=1}^{N} \Pi_i T_i}{\sum_{i=1}^{N} \Pi_i} \quad (2b)$$

$$\tau_{eq} = \frac{1}{\sum_{i=1}^{N} \Pi_i} \quad (2c)$$

Using the definitions given by equations (2a), (2b), and (2c) the governing differential equation takes the following form:

$$\tau_{eq}\frac{dT_m}{dt} = T_{eq} - T_m \qquad (3)$$

Taking Laplace transform of (3) and assuming zero initial conditions gives familiar first order transfer function relating the component material temperature and equivalent temperature in s-domain:

$$\frac{T_m(s)}{T_{eq}(s)} = \frac{1}{\tau_{eq}s + 1} \qquad (4)$$

In summary, the result of (3) incorporates the following assumptions:

(a) the component is undergoing a so called quasi-equilibrium process, i.e., uniform metal temperature at all times (b) finite number of fluid flows have fixed area of contact with the system (c) heat transfer coefficient characterizing heat exchange for each fluid flow remains constant (d) specific heat of the component material is constant (e) system energy change because of heat exchange with the surroundings can be decoupled from work related energy change A closed form solution to equation (3) can be obtained to a step change in equivalent fluid temperature. Making use of Laplace transform technique with some algebraic manipulation leads to the following expression for the component material temperature as a function of time:

$$T_m(t) = T_m(0) + [T_{eq}(t) - T_m(0)][1 - e^{-t/\tau_{eq}}] \qquad (5)$$

The result of equation (5) can be applied over time step to obtain difference equation for use in the controller:

$$T_{m,t} = T_{m,t-dt} + [T_{eq,t} - T_{m,t-dt}][1 - e^{-dt/\tau_{eq}}] \qquad (6)$$

where equivalent fluid temperature and equivalent time constant defined per equation (2).

Similar analysis for ramp change in equivalent fluid temperature results in the following expression for the component material temperature:

$$T_m(t) = T_{eq}(0) + t \cdot k_{rate} + [T_m(0) - T_{eq}(0) + k_{rate}\tau_{eq}]e^{-t/\tau_{eq}} \qquad (7)$$

where $$k_{rate} = \frac{T_{eq}(t) - T_{eq}(0)}{dt}$$

Similarly, equation (7) leads to the following difference equation:

$$T_{m,t} = \qquad (8)$$
$$T_{eq,t-dt} + dt \cdot k_{rate} - \tau_{eq}k_{rate} + [T_{m,t-dt} - T_{eq,t-dt} + k_{rate}\tau_{eq}]e^{-dt/\tau_{eq}}$$

where $$k_{rate} = \frac{T_{eq,t} - T_{eq,t-dt}}{dt}$$

Equations (6) and (8) can now be transformed into expressions for the component radial growth because of thermal expansion of the component material. The component temperature is replaced directly with thermal growth (dR). The equivalent fluid temperature, on the other hand, represents the driving force of the growth process and is replaced with what is referred to as steady state growth. Steady state growth is the radial growth that the component would have attained had it remained in contact with the fluid indefinitely.

Thus, the resulting expressions for thermal growth based on closed form solution to a step input becomes:

$$dR_t = dR_{t-dt} + [dR_{ss,t} - dR_{t-dt}][1 - e^{-dt/\tau_{eq}}] \qquad (9)$$

The resulting expression for thermal growth based on closed form solution to a ramp input becomes:

$$dR_t = dR_{ss,t-dt} + dt \cdot k_{rate} - \qquad (10)$$
$$\tau_{eq}k_{rate} + [dR_{t-dt} - dR_{ss,t-dt} + k_{rate}\tau_{eq}]e^{-dt/\tau_{eq}}$$

where $$k_{rate} = \frac{dR_{ss,t} - dR_{ss,t-dt}}{dt}$$

Similarly, equations (2a), (2b) and (2c) are used to obtain the expressions for steady state thermal growth and equivalent time constant:

$$\Pi_i = \frac{A_i h_i}{c_{pm,i} M} \qquad (11a)$$

$$dR_{ss} = \mu \frac{\sum_{i=1}^{N}\Pi_i T_i}{\sum_{i=1}^{N}\Pi_i} + \kappa \qquad (11b)$$

$$\tau_{eq} = \frac{1}{\sum_{i=1}^{N}\Pi_i} \qquad (11c)$$

In a practical application, such as a clearance model used in a turbine case cooling control system, the thermal growth of the turbomachine component can be accurately represented by equation (9). This is due to a relatively fast model execution rate (e.g. 0.1 sec and less is typically used) on a modern digital computer such as FADEC of gas turbine engine.

Equation (9) is then fitted with approximating coefficients to arrive at the following version of an on-board transient model of thermal radial growth:

$$dR_t = dR_{t-dt} + [a \cdot dR_{ss,t} - dR_{t-dt}] \cdot [1 - e^{-dt/\tau_{eq}}] \qquad (12)$$

As can be seen an approximating coefficient "a" appears in (12) as a convenient adjustment factor that allows to adjust steady state growth of the component (e.g. to better fit a particular hardware version of the component). For that and some other reasons additional approximating coefficients are introduced in the expressions for steady state growth and equivalent time constant.

The approximating equation for steady state growth is derived from equation (11) by introducing two types of approximating coefficients 'k' and 'z' as follows:

$$dR_{ss} = \frac{\sum_{i=1}^{n} k_i \{\Pi_i\}^{Z_i} T_i}{\sum_{i=1}^{n} k_i \{\Pi_i\}^{Z_i}} + k_0 \quad (13)$$

The approximating equation for the equivalent time constant of thermal growth is derived from equation (11) by introducing two types of approximating coefficients 'b' and 'z' as follows:

$$\tau_{eq} = \frac{1}{\sum_{i=1}^{n} b_i \{\Pi_i\}^{Z_i}} \quad (14)$$

The coefficients 'a', 'k', 'z' and 'b' in the above equations are used to calibrate the component thermal growth model to higher fidelity model and/or test data. This helps to offset a negative effect of the assumptions made when deriving the equations. At the same time it facilitates the model traceability to a specific set of turbomachine hardware which may be changing through the operating life of the machine.

The obtained model can be utilized to model dynamics of higher order than one. This is accomplished by modeling a turbomachine component as a sum of a finite number of sub-components each represented by the subject model. For example, in the turbine case cooling control system it is often assumed that each of the turbine components (disk, blade and a case) can have up to three sub-components thus raising the order of dynamics to 3. This allows to properly account for complex geometry of the HPT components.

The following is an example of a set of difference equations and performance parameters that can be used in the control software to model radial thermal growth of a turbomachine component having three subcomponents. The difference equations are given by:

$dR_t = dR_{1,t-dt} + [1-\exp\{b_1$ $(\Pi_1^{z11} + \hat{b}_1 \Pi_2^{z12})$ $dt\}] \cdot [a_1 \cdot dR_{ss,t-dt} - dR_{1,t-dt}]$ $+ dR_{2,t-dt} + [1-\exp\{b_2(\Pi_1^{z21} + \hat{b}_2 \Pi_2^{z22})$ $dt\}] \cdot [a_2 \cdot dR_{ss,t-dt} - dR_{1,t-dt}]$ $+ dR_{3,t-dt} + [1-\exp\{b_3(\Pi_1^{z31} + \hat{b}_3 \Pi_2^{z32})$ $dt\}] \cdot [a_2 \cdot dR_{ss,t-dt} - dR_{1,t-dt}] \quad (15)$ The performance parameters are given by:

$$\Pi_{1,disk} = \frac{(N_2 P_3)^{0.8}}{T_3^{0.5646}} \quad (16a)$$

$$\Pi_{1,blade} = T_3^{0.235} W_{25}^{0.8} \quad (16b)$$

$$\Pi_{1,case} = T_3^{0.235} W_{25}^{0.8} \quad (16c)$$

$$\Pi_{2,case} = T_{125}^{0.235} W_{tcc}^{0.8} \quad (16d)$$

Note, that except for the case component a single performance parameter is used.

The steady state thermal growths of disk and blade are correlated as follows:

$$dR_{ss,disk} = k_{dk,T_{25}} T_{25} + k_{dk,T_4} T_4 + k_{dk,T_3} T_3 + k_{dk,o} \quad (17a)$$

$$dR_{ss,blade} = k_{bd,T_4} T_4 + k_{bd,T_3} T_3 + k_{bd,o} \quad (17b)$$

Note, the contribution of each of the influence temperatures in equation (17) is apportioned with an approximating coefficient that is constant. This differs with the fundamental relationship of equation (11). As was shown, the coefficients vary with the engine operating parameters which is reflected in equation (11). However, it is believed that the resulting errors are small for disk and blade, and equations (17a) and (17b) adequately describe steady state thermal growth of these components.

The case component on the other hand, experiences a significant change in the influencing coefficients particularly due to changes in turbine case cooling flow. To properly account for that effect the development of steady state growth expression for the case component starts back with physics based relationship (11). It then assumes that in absence of turbine case cooling flow the influence coefficients are constant. The analysis proceeds to establish corrections to these coefficients for the case of non-zero case cooling flow. As described, the additional assumptions made in the development depart from the original result (1). However, it is believed that the main effect of varying case cooling flow is being captured well and preliminary regression analysis gives acceptable results. Omitting detailed derivation steady state growth of case component takes the following form:

$$dR_{ss,eq,case} = \left\{ k_{cs,T_3} - \frac{\Psi}{1 + \frac{k_{cs,T_4}}{k_{cs,T_3}}} \right\} \cdot T_3 + \quad (18)$$

$$\left\{ k_{cs,T_4} - \frac{\Psi \frac{k_{cs,T_4}}{k_{cs,T_3}}}{1 + \frac{k_{cs,T_4}}{k_{cs,T_3}}} \right\} \cdot T_4 + \Psi \cdot T_{125} + k_{cs,o}$$

where $$\Psi = \frac{(k_{cs,T_3} + k_{cs,T_4}) \cdot k_{cs,tcc} \cdot \Pi_{2,case}^{Z_{2,case}}}{k_{cs,core}\left(1 + \frac{k_{cs,T_4}}{k_{cs,T_3}}\right) \cdot \Pi_{1,case}^{Z_{1,case}} + k_{cs,case} \cdot \Pi_{2,case}^{Z_{2,case}}}$$

In summary, the foregoing analysis shows that an accurate determination of and control of thermal growth of engine components may be accomplished.

Although the invention has been shown and described in a preferred embodiment, it should be understood that numerous modifications can be made without departing from the spirit and scope of the present invention. Accordingly, the present invention has been shown and described by way of illustration rather than limitation.

What is claimed is:

1. A method of controlling clearance in a turbomachine between turbomachine component blades and a wall adjacent to and opposing tips of the blades, the method comprising the steps of:

determining components and if necessary subcomponents of the turbomachine such that thermal growth of each component or subcomponent is governed by $1^{st}$ order differential equation in terms of component material temperature;

determining fluid streams that exchange heat with the components or subcomponents each characterized by distinct temperature and flow rate;

determining from a measurement and/or synthesis the temperatures and flow rates of the fluid streams defined for each of the components or subcomponents;

determining from a measurement and/or synthesis parameters appearing in performance parameter correlations including temperatures, pressures and shaft speeds;

determining turbomachine component heat transfer performance parameters each as a function of measured and otherwise synthesized engine characteristics including shaft speeds, pressures and temperatures;

determining steady state growth of the turbomachine components each as a weighted average of growths resulting from thermal exchange with fluid streams of varying temperatures, flow rates and thermo-physical properties where weighting factors include the heat transfer performance parameters;

determining an inverse of an equivalent time constant of the turbomachine components each as a sum of the respective performance parameters;

determining thermal growth of the turbomachine components each with a difference equation by applying a closed form solution to a governing first order differential equation over a predetermined time step for a specified change in a forcing function, the forcing function including the steady state growth of the respective turbomachine component, and the time constant including the equivalent time constant;

populating the equations for steady state growth, equivalent time constant and thermal growth difference equations with the approximating coefficients that are determined from regression analysis that minimizes errors between the subject thermal growth model and higher fidelity model and/or test data;

determining the turbomachine tip clearance as total sum of all the turbomachine component and subcomponent growths where thermal growth of the turbomachine components or subcomponents is obtained with the subject thermal growth model; and controlling the turbomachine tip clearance based on the difference between desired and actual clearance of turbomachine components as determined by the thermal growth of the turbomachine components.

2. A method of controlling clearance as defined in claim 1, wherein the step of controlling includes adjusting an amount of air flow adjacent to the wall in response to the thermal growth.

3. A method of controlling clearance as defined in claim 2, wherein the step of adjusting an amount of air flow includes adjusting a butterfly valve.

4. A method of controlling clearance as defined in claim 3, wherein the step of adjusting an amount of air flow further includes moving a piston actuator controllably coupled to the butterfly valve by means of a torque motor.

5. A method of controlling clearance as defined in claim 1, wherein the step of determining thermal growth includes determining each heat transfer performance parameter by calculating the result of a first product divided by a second product, the first product including an area of contact of fluid flow and a turbocahine component multiplied by a heat transfer coefficient of fluid flow, and the second product including a specific heat of the turbomachine component multiplied by a mass of the turbomachine component.

6. A method of controlling clearance as defined in claim 1, wherein the weighted average of thermal growths is based on a plurality of turbomachine sub-components.

7. A method of controlling clearance as defined in claim 1, wherein the turbomachine is a gas turbine engine, and the wall opposing the tips of the blades is the case of the engine.

8. A method of controlling clearance as defined in claim 1, wherein the turbomachine is a turbine engine, and the turbomachine components include a blade, a disk and a case of the engine.

9. A method of controlling clearance as defined in claim 8, wherein sub-components of the disk include a bore, a web and a rim.

10. A system for controlling clearance in a turbomachine between turbomachine component blades and a wall adjacent to and opposing tips of the blades, the system comprising:

means for determining components and if necessary subcomponents of the turbomachine such that thermal growth of each component or subcomponent is governed by $1^{st}$ order differential equation in terms of component material temperature;

means for determining fluid streams that exchange heat with the components or subcomponents each characterized by distinct temperature and flow rate;

means for determining from a measurement and/or synthesis the temperatures and flow rates of the fluid streams defined for each of the components or subcomponents;

means for determining from a measurement and/or synthesis parameters appearing in performance parameter correlations including temperatures, pressures and shaft speeds;

means for determining turbomachine component heat transfer performance parameters each as a function of measured and otherwise synthesized engine characteristics including shaft speeds, pressures and temperatures;

means for determining steady state growth of the turbomachine components each as a weighted average of growths resulting from thermal exchange with fluid streams of varying temperatures, flow rates and thermo-physical properties where weighting factors include the heat transfer performance parameters;

means for determining an inverse of an equivalent time constant of the turbomachine components each as a sum of the respective performance parameters;

means for determining thermal growth of the turbomachine components each with a difference equation by applying a closed form solution to a governing first order differential equation over a predetermined time step for a specified change in a forcing function, the forcing function including the steady state growth of the respective turbomachine component, and the time constant including the equivalent time constant;

means for populating the equations for steady state growth, equivalent time constant and thermal growth difference equations with the approximating coefficients that are determined from regression analysis that minimizes errors between the subject thermal growth model and higher fidelity model and/or test data;

means for determining the turbomachine tip clearance as total sum of all the turbomachine component and subcomponent growths where thermal growth of the turbomachine components or subcomponents is obtained with the subject thermal growth model; and means for controlling the turbomachine tip clearance based on the difference between desired and actual clearance of turbomachine components as determined by the thermal growth of the turbomachine components.

11. A system as defined in claim 10, wherein the controlling means includes means for adjusting an amount of air flow adjacent to the wall in response to the thermal growth.

12. A system as defined in claim 11, wherein the adjusting means includes:

a torque motor communicating with the controlling means;

a piston actuator drivingly coupled to the torque motor; and a butterfly valve controllably coupled to the actuator.

13. A system as defined in claim 10, wherein the controlling means includes means for determining each transfer performance parameter by calculating the result of a first product divided by a second product, the first product including an area of contact of fluid flow and a turbomachine component multiplied by a heat transfer coefficient of fluid flow, and the second product including a specific heat of the turbomachine component multiplied by a mass of the turbomachine component.

14. A system as defined in claim 10, wherein the turbomachine is a gas turbine engine, and the wall opposing the tips of the blades is the case of the engine.

15. A turbine engine system comprising:

a turbine engine including case and blades rotatable within the case;

means for determining components and if necessary subcomponents of the turbine engine such that thermal growth of each component or subcomponent is governed by $1^{st}$ order differential equation in terms of component material temperature;

means for determining fluid streams that exchange heat with the components or subcomponents each characterized by distinct temperature and flow rate;

means for determining from a measurement and/or synthesis the temperatures and flow rates of the fluid streams defined for each of the components or subcomponents;

means for determining from a measurement and/or synthesis parameters appearing in performance parameter correlations including temperatures, pressures and shaft speeds;

means for determining turbine engine component heat transfer performance parameters each as a function of measured and otherwise synthesized engine characteristics including shaft speeds, pressures and temperatures;

means for determining steady state growth of the turbine engine components each as a weighted average of growths resulting from thermal exchange with fluid streams of varying temperatures, flow rates and thermo-physical properties where weighting factors include the heat transfer performance parameters;

means for determining an inverse of an equivalent time constant of the turbine engine components each as a sum of the respective performance parameters;

means for determining thermal growth of the turbine engine components each with a difference equation by applying a closed form solution to a governing first order differential equation over a predetermined time step for a specified change in a forcing function, the forcing function including the steady state growth of the respective turbine engine component, and the time constant including the equivalent time constant;

means for populating the equations for steady state growth, equivalent time constant and thermal growth difference equations with the approximating coefficients that are determined from regression analysis that minimizes errors between the subject thermal growth model and higher fidelity model and/or test data;

means for determining the turbine engine tip clearance as total sum of all the turbine engine component and subcomponent growths where thermal growth of the turbine engine components or subcomponents is obtained with the subject thermal growth model; and means for adjusting an amount of air flow adjacent to the wall in response to the thermal growth.

16. A system as defined in claim 15, further including:

at least one sensor for measuring engine speed; and at least one sensor for measuring burner pressure, measurements generated by the sensors for determining the temperatures of the turbine engine components, the temperature of fluid flow, and the fluid flow rate.

17. A system as defined in claim 15, wherein the adjusting means includes means for determining each heat transfer performance parameter by calculating the result of a first product divided by a second product, the first product including an area of contact of fluid flow and a turbine engine component multiplied by a heat transfer coefficient of fluid flow, and the second product including a specific heat of the turbine engine component multiplied by a mass of the turbine engine component.

18. A system as defined in claim 15, wherein the turbine engine is a gas turbine engine.

19. A system as defined in claim 15, wherein the adjusting means includes:

a torque motor communicating with the controlling means;

a piston actuator drivingly coupled to the torque motor; and a butterfly valve controllably coupled to the actuator.

\* \* \* \* \*

UNITED STATES PATENT AND TRADEMARK OFFICE
CERTIFICATE OF CORRECTION

PATENT NO.  : 6,487,491 B1  Page 1 of 1
DATED       : November 26, 2002
INVENTOR(S) : Boris Karpmann et al.

It is certified that error appears in the above-identified patent and that said Letters Patent is hereby corrected as shown below:

<u>Column 11,</u>
Line 67, "turbobcahine" should read -- turbomachine --.

<u>Column 13,</u>
Line 20, please insert -- heat -- after "each".

Signed and Sealed this

First Day of April, 2003

JAMES E. ROGAN
*Director of the United States Patent and Trademark Office*